Dec. 11, 1934.　　　　　J. CALLEY　　　　　1,983,692
WELDING DEVICE
Filed June 13, 1932　　　3 Sheets-Sheet 1
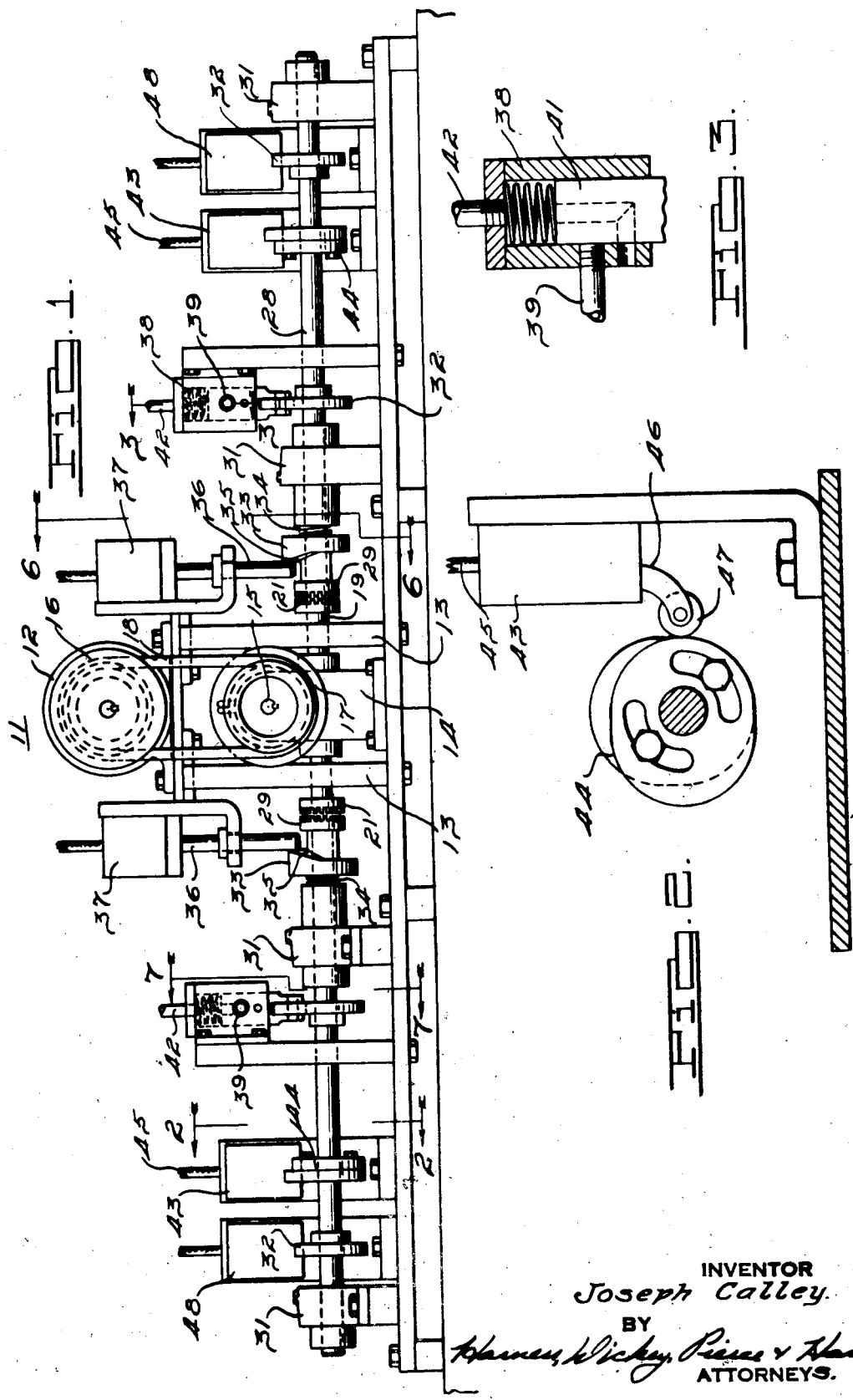
INVENTOR
Joseph Calley.
BY
ATTORNEYS.

Dec. 11, 1934. J. CALLEY 1,983,692
WELDING DEVICE
Filed June 13, 1932 3 Sheets-Sheet 2
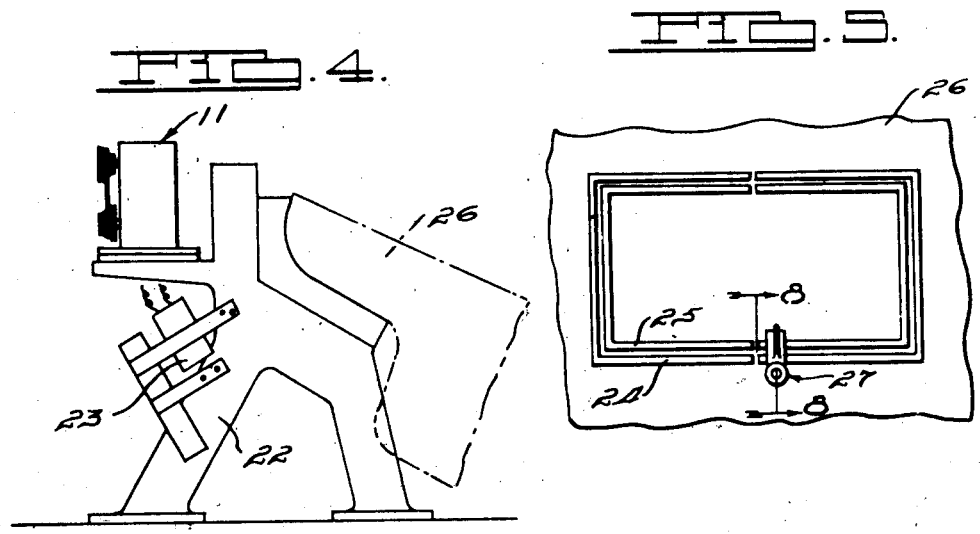
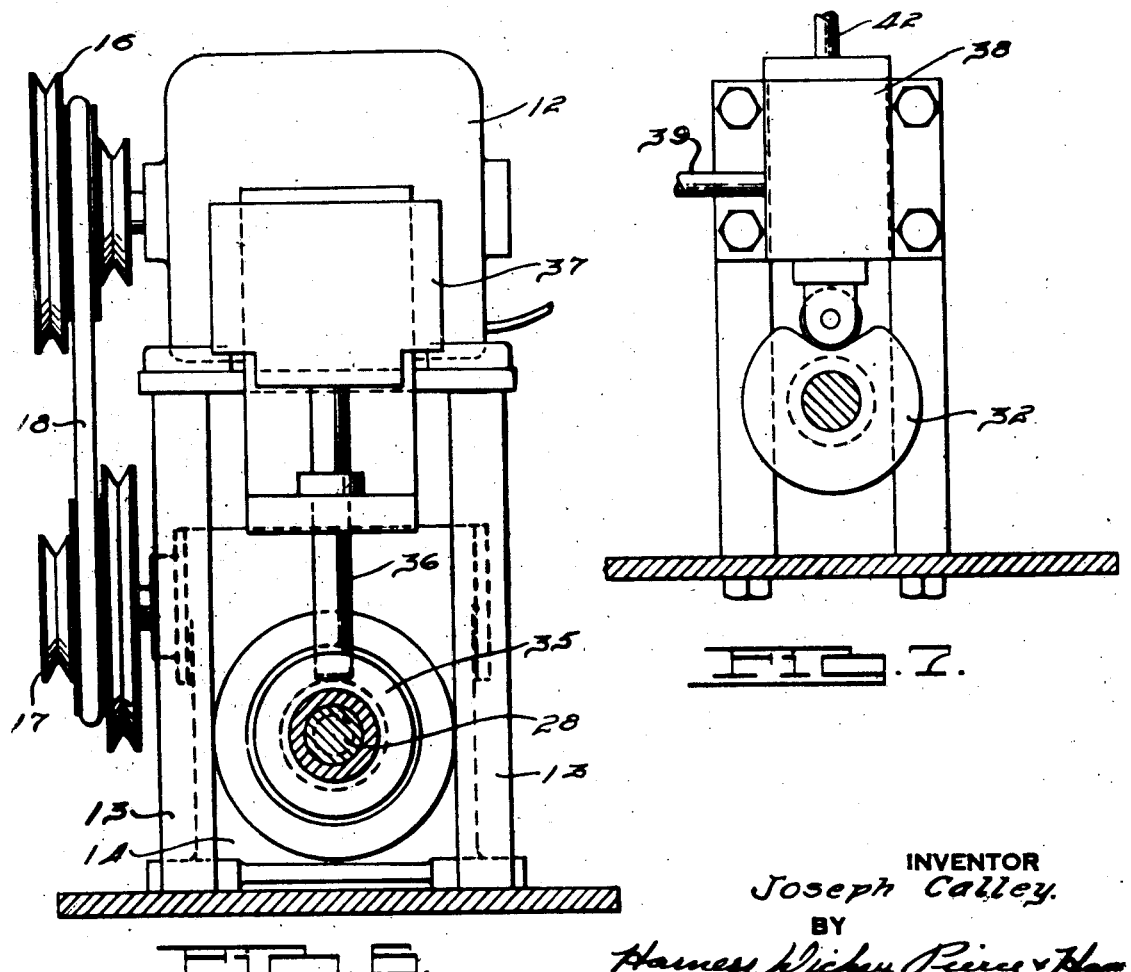
INVENTOR
Joseph Calley.
BY
ATTORNEYS.

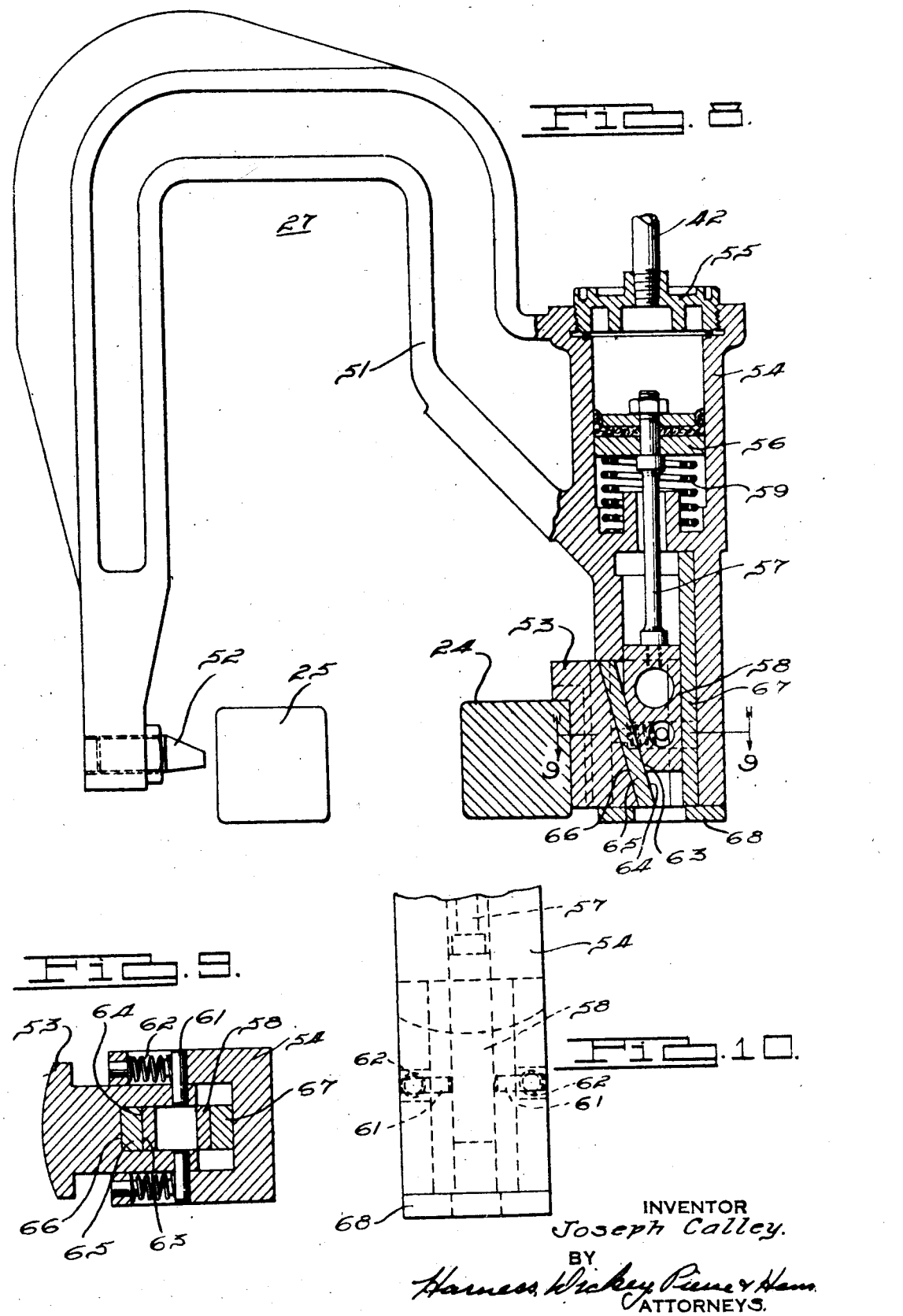

Patented Dec. 11, 1934

1,983,692

UNITED STATES PATENT OFFICE 1,983,692

WELDING DEVICE

Joseph Calley, Detroit, Mich., assignor to The Murray Corporation of America, a corporation of Delaware Application June 13, 1932, Serial No. 616,872

5 Claims. (Cl. 219—4)

My invention relates to welding devices and particularly to a welding device of the bar type wherein a pair of conducting bars are so supported as to have the work elements to be welded engage one of the bars and a bridging member employed to connect the elements to the opposite bar for effecting a flow of current through the bars and the elements to weld the latter.

It has been the practice in the past to employ sets of bars which are spaced apart and mounted in such manner as to have one of the bars form a portion of the clamping element for receiving and retaining two elements to be welded in fixed predetermined relation. A bridging lever was employed to engage the work at a predetermined point and the opposite bar. A switch was mounted on the lever for completing a circuit to effect a flow of current through the bars and the elements to be welded, to weld the elements together at the point through which the current flows. In such an arrangement the personal element of the operator had a great deal to do with the type of joints produced, caused by the amount of pressure exerted on the bridging lever and the length of time that current was permitted to flow through the work elements. If sufficient pressure were not applied to the work elements, the resistance would be so high that only a small portion of current could flow through any one spot and as a result a melting of the metal did not occur and substantially no weld was formed. On the other hand, if sufficient pressure were applied to the lever to provide a spot of relatively low resistance to flow of current in comparison to the surrounding area of the elements, the length of time that current is permitted to flow therethrough is another factor in determining whether or not a sound joint will result. If the current flows for too short a time, a sufficient melting will not occur while, if the current flows for too great a time, too great a melting will occur which also will result in a poor weld.

My present invention eliminates the personal element from the operation of the welding device and similar welds are produced at all points along the work pieces. To accomplish this, I employ a welding device which bridges the bars and is provided with a pair of electrodes, one of which is movable toward the other and actuatable by a piston and plunger under the control of the operator. Air enters a cylinder, which encompasses the piston, and drives the piston forward to force the movable electrode toward the stationary electrode and thereby clamp the work between the two bars. The size of the piston is so chosen relative to the air pressure and the mechanism as to produce a force of substantially six hundred pounds to clamp the work elements against the bar which pressure is assured for each point to be welded. Additional apparatus is employed for closing and opening the circuit through the bars, synchronized with the actuation of the piston and timed in accordance with the type of work, thickness of material and amount of current employed. After the weld has been completed and the current shut off, the pressure of air on the piston is automatically released so that the device is freed from the work and may be moved to a succeeding point to be welded. The entire welding in this manner is done automatically as far as the timing pressure and flow of current is concerned, it being only necessary for the operator to press a switch button, after the device has bridged the bars and work elements, to cause the clamping and welding of the elements and the release of the device.

Accordingly, the main objects of my invention are to provide a welding device of the above mentioned type with means for automatically applying a pressure to the work and controlling the time of flow of current therethrough to produce standard and like welds; to provide a device for bridging the work and current-carrying bars which contains actuating means for moving one of the electrodes of the device toward the other for clamping the work against a bar with a predetermined pressure; to provide a switch on the device for controlling a mechanism that effects the automatic operation of the clamping mechanism of the device; to provide a switch in the mechanism which is controlled in sequence with the actuation of the clamping mechanism for producing a flow of current through the bars, the work and the device after the clamping operation; to provide means thereafter for cutting off the flow of current and thereafter releasing the clamping mechanism for freeing the device from the work; to provide a completely controlled device for clamping the work to a conductor bar with a predetermined pressure and for producing a flow of current therethrough for a predetermined interval of time after which the current is cut off and the device released, all of which is effected automatically through the operation of the switch on the side of the device; and, in general, to provide a welding device which eliminates the personal equation present heretofore, which is simple in operation, and positive in results.

Other objects and features of novelty of my invention will be either specifically pointed out or will become apparent when referring, for a better understanding of my invention, to the following description in conjunction with the accompanying drawings, wherein:

Figure 1 is a view, in elevation, of a control mechanism embodying features of my invention;

Fig. 2 is a sectional view of the structure illustrated in Fig. 1, taken on the line 2—2 thereof;

Fig. 3 is a sectional view of the structure illustrated in Fig. 1, taken on the line 3—3 thereof;

Fig. 4 is a reduced sectional view of a machine upon which the device illustrated in Fig. 1 is mounted;

Fig. 5 is a broken plan view of the structure illustrated in Fig. 4;

Fig. 6 is an enlarged sectional view of the structure illustrated in Fig. 1, taken on the line 6—6 thereof;

Fig. 7 is an enlarged sectional view of the structure illustrated in Fig. 1, taken on the line 7—7 thereof;

Fig. 8 is an enlarged sectional view of the structure illustrated in Fig. 5, taken on the line 8—8 thereof;

Fig. 9 is a sectional view of the structure illustrated in Fig. 8, taken on the line 9—9 thereof, and Fig. 10 is an enlarged broken view, in side elevation, of the structure illustrated in Fig. 8.

The control mechanism illustrated in Fig. 1 is provided for automatically applying a clamping pressure to a welding device for forcing the work elements into intimate relation to each other and to a conducting bar against which it is clamped. After the device is clamped in this manner the current is permitted to flow for a predetermined length of time through the work pieces, after which the current is automatically shut off and the device released from the work and the weld thus produced is of standard form because of the predetermined pressure always applied to the two work elements to be welded and the constant time of flow of current through the material.

Referring to Figs. 1 and 2, the control device 11 includes a motor 12 mounted on suitable uprights 13 between which brackets 14 are provided for mounting the shaft 15 on which a worm (not shown) is attached. Pulleys 16 and 17 are mounted respectively on the shaft of the motor and on the worm shaft 15 and are interconnected by a belt 18 which may be applied to various pairs of pulleys for obtaining a variation in the speed of the mechanism. A shaft 19 is mounted in bearings provided in the brackets 14, at right angles to the shaft 15, and has a wheel (not shown) provided thereon in engagement with the worm on the shaft 15 for driving the shaft 19 in rotation. Clutch elements 21 are mounted at each end of the shaft 19 for purposes to be explained hereinafter. The mechanism thus described is the driving means for controlling the operation of switches and devices for regulating the clamping of the device and the flow of current through the work elements.

Referring to Figs. 4 and 5, the control mechanism 11 is illustrated as being mounted upon the frame 22 whereon a pair of transformers 23 for providing current to the bars 24 and 25 are secured. The bars are connected to each side of the secondaries of the transformers 23, the primary side being connected to a source of supply through a switch on the device 11. The conducting bars 24 and 25 are shaped to receive a work element such as the deck portion of an automobile body 26 around the opening of which the welding operation is to be effected. The bars 24 and 25 are provided in two pairs substantially U-shaped, as illustrated in Fig. 5, one of the transformers being connected to a set of bars. In this construction two operators are employed, each to operate a bridging device 27 by which the weld is effected relative to each set of bars and, in this construction, two complete control systems are necessary.

Referring again to Fig. 1, it will be noted that the actuating portion of the device 11 has similar control elements on each of its sides, one for controlling the flow of current through the device 27 on the right hand set of bars while the other controls the flow of current through the left hand set of bars. Shafts 28 are provided on each side of the actuating mechanism in extension of the shaft 19 and are provided with clutch elements 29 on their ends for engagement with the clutch elements 21, provided on the shaft 19. The shafts 28 are mounted in bearings in the brackets 31 and have sets of cams 32 attached thereto in a well known manner. Additional cams 33 are mounted on each of the shafts and springs 34 are mounted between the cams and bearing in the brackets 31 for urging the shafts, and therefore the clutch elements 29, toward the clutch elements 21. Cam faces 35, on the inner side of the cams 33, are engaged by rods 36 mounted on solenoids 37, for disconnecting the clutch elements 29 from the clutch elements 21. When the solenoids 37 are energized the rods 36 are moved upwardly out of contact with the cam faces 35 permitting the springs 34 to bias the clutch elements 29 into engagement with the clutch elements 21 to cause the shafts 28 to rotate with the shaft 19. The rotation of the shafts 28 rotates the cams 32 for effecting the sequence of operation of the clamping of the devices 27 and the flow of current therethrough as above pointed out.

Since the elements actuated by the shafts 28 are the same on both sides of the mechanism only those on one side will now be described. An air valve 38 is mounted above the shaft 28 in proximity to a cam 32 and has a supply line 39 connected thereto, as illustrated in Fig. 3. The supply line is connected by the movement of a valve 41 to cause air to flow from the valve through the conductor 42 to the device 27. The camming surface is so chosen as to immediately operate the valve 41 when the shaft 28 is first rotated and to continue to retain the valve in open position substantially the entire revolution of the shaft.

A switch 43 is mounted adjacent to the adjustable cam 44 and has conductors 45 connected thereto which control the flow of current to the primary side of the transformer 23. The switch 43, as illustrated in Fig. 2, is provided with an arm 46 with a roller 47 on the end thereof which engages the adjustable cam 44. The cam 44 is made up of elements which may be adjusted relative to each other for timing the closed position of the switch to regulate the duration of flow of current through the device 27. An additional element 48 is mounted adjacent to the shaft which may be a switch similar to switch 45 or which may be a device similar to the valve 38 and which is preferably employed for conducting water or other cooling medium through the device 27 for preventing the electrodes thereof from becoming hot when rapidly operated. A cam 32 is employed for actuating the element 48 during the rotation of shaft 28.

A device such as described is utilized for producing one sequence of operation after which the rod 36, having immediately dropped into lowered position, engages the cam face 35, as the revolution of the shaft 28 is substantially completed, to move the shaft away from the shaft 19 and disconnect the clutch elements 21 and 29. During the revolution of the shaft 28, the valve 38 is first actuated for clamping the device 27 across the work and conductor bars 24 and 25 after which the switch 43 is actuated for controlling the flow of current through the device for effecting the weld, after which the current is shut off and the valve 38 moved to disconnected position as illustrated in Fig. 3, in which position air is ported from the conductor 42, to release of the device 27 which may then be moved to the next spot to be welded.

Referring to Figs. 8, 9 and 10, I have illustrated a device 27 as comprising a U-shaped connecting element 51 having a stationary electrode 52 on one of its ends and a movable electrode 53 on its opposite end, in aligned relation. A cylinder 54 is provided adjacent to the end supporting the movable electrode 53 having a head 55 thereon to which the conductor 42 is secured. A piston 56 is mounted in the cylinder 54 and is connected to a rod 57 secured to an actuating head 58 which is slidably mounted in the end of the member 51. A spring 59 is mounted on the lower side of the piston 56 for retrieving the piston after the air is conducted from the cylinder 54. The movable electrode 53 has outwardly extending pins 61 attached to the sides thereof.

Pins 61 are engaged by springs 62 for moving the electrode 53 in a direction away from the electrode 52. The actuating member 58 has a sloping side 63 which mates with a side 64 of a hardened element 65 which is disposed in a sloping recess 66 in the rear side of the movable electrode 53. The opposite side of the actuating element 58 engages a hardened element 67 which is welded, screwed or otherwise attached to the rear wall of the aperture within the lower arm of the element 51 as illustrated in Fig. 8. A closure plate 68 is provided at the bottom of the arm.

When air is conducted within the cylinder 54, the piston 56 is moved downwardly forcing the actuating element 58 downwardly therewith and, through the engagement with the sloping side 63 thereof with the sloping side of the element 65, the movable electrode 53 is moved outwardly toward electrode 52 to thereby clamp the work elements and the conducting bars 24 and 25. When the valve 41 is actuated to release the air within the cylinder 54, the spring 59 is available for moving the piston 56 upwardly within the cylinder 54 to thereby move the element 58 upwardly out of engagement with the element 53 to permit the springs 62 to bias the arms 61 in such manner as to move the electrode 53 away from the electrode 52. The device 27 is then ready to be removed to the next point to be welded after which the control button (not shown), controlling the flow of current through the solenoid 37, is then actuated for causing a cycle of operation, as pointed out hereinabove.

The structure thus described is a considerable advancement in the art over devices heretofore employed for welding sheet metal at predetermined points when clamped against a conducting bar in view of the predetermined pressure always provided between the elements to be welded and a bar and the constant flow of current for a predetermined length of time only, which produces like welds at all points to be welded.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. A device for welding sheet material including, in combination, a pair of spaced conducting bars against one of which the work to be welded is supported, a bridging device therefor having electrodes thereon one of which is movable to form a clamp, a source of current for effecting the welding operation, and automatic means separately and remotely disposed for effecting a sequence of operation, including the clamping of the device, the flow of current therethrough, the interruption of the current and the unclamping of the device.

2. A device for welding sheet material including, in combination, a pair of spaced conducting bars against one of which the sheets to be welded are supported, a bridging device therefor having electrodes one of which is movable to form a clamp for producing a predetermined pressure between the bars and the sheets, a source of current, a switch on said device, a control mechanism separatey and remotely disposed and actuated by the operation of said switch for effecting a sequence in operation including the clamping of the device, producing a flow of current therethrough, interrupting the current and releasing the device in rapid sequence.

3. A device for welding sheet material including, in combination, a pair of spaced conducting bars, positioning means for supporting the sheets adjacent to one of the bars, a bridging device for spanning the other bar and sheets, means on said device for applying a pressure between the sheets and bars, remote means for effecting the actuation of the pressure applying means, and means controlling said remote means.

4. A device for welding sheet material including, in combination, a pair of spaced conducting bars, positioning means for supporting the sheets adjacent to one of the bars, a bridging device provided with a pair of electrodes, one of which is movable, employed for bridging the other bar and work, remote means for controlling the movement of the movable electrode for applying a predetermined pressure between the work and bars, and means on said device for actuating said remote means.

5. A device for welding sheet material including, in combination, a pair of spaced conducting bars, positioning means for supporting the sheets adjacent to one of the bars, a bridging device for spanning the other bar and sheets provided with a pair of electrodes, one of which is movable, remote means for controlling the movement of the movable electrode for applying a predetermined pressure between the sheets and bars, said remote means also controlling the flow of current between the sheets, the bars and the bridging device in timed sequence to said application of pressure to the electrodes, and means for actuating said remote means.

JOSEPH CALLEY.